United States Patent

[11] 3,609,326

| [72] | Inventors | Alan S. Bagley<br>Los Altos Hills;<br>France Rode, Palo Alto, both of Calif. |
|---|---|---|
| [21] | Appl. No. | 793,114 |
| [22] | Filed | Jan. 22, 1969 |
| [45] | Patented | Sept. 28, 1971 |
| [73] | Assignee | Hewlett-Packard Company<br>Palo Alto, Calif. |

[54] COUNTING APPARATUS AND METHOD USING SEPARATE COUNTERS FOR REFERENCE AND UNKNOWN SIGNAL
3 Claims, 3 Drawing Figs.

[52] U.S. Cl.................................................. 235/152,
235/92 TF, 324/79
[51] Int. Cl. ............................................... G01r 23/10
[50] Field of Search............................................ 235/152,
156, 164, 92 CP, 92 F, 92 TF, 92; 324/78, 79;
328/134, 140

[56] References Cited
UNITED STATES PATENTS

| 2,677,104 | 4/1957 | Chase............................ | 324/78 |
| 2,951,202 | 8/1960 | Gordon .......................... | 324/79 |
| 3,221,250 | 11/1965 | Wang............................. | 324/78 |
| 3,412,329 | 11/1968 | Grangvist....................... | 328/134 X |
| 3,450,991 | 6/1969 | Tarczy-Hornoch.......... | 324/79 |

*Primary Examiner*—Malcolm A. Morrison
*Assistant Examiner*—David H. Malzahn
*Attorney*—A. C. Smith

ABSTRACT: Improved apparatus and method for determining the rate of recurrence of input events involves counting recurring input events and recurring reference events for a period of time that is determined by the desired length of measurement period, and the timing of the input events. The desired output indication of recurrence rate of input events is provided by arithmetically dividing the arbitrary number of input events occurring within the measurement period by the arbitrary number of reference events occurring within the same measurement period.

PATENTED SEP28 1971      3,609,326

INVENTORS
ALAN S. BAGLEY
FRANCE RODE

BY  A. C. Smith
ATTORNEY

COUNTING APPARATUS AND METHOD USING SEPARATE COUNTERS FOR REFERENCE AND UNKNOWN SIGNAL

BACKGROUND OF THE INVENTION

Certain known commercial instruments commonly count input pulses recurring at an unknown rate for a period of time determined by the known recurrence rate of reference pulses to provide an output indication of frequency of the input pulses. These commercial instruments are also usually capable of counting the recurring reference events for a period of time determined by the recurrence rate of input events. This period-measuring mode of operation usually provides greater measurement resolution in a given measuring interval because the recurrence rate of the reference pulses that are counted may be chosen to be at about the upper limit of counting speed of the instrument for all operating values of recurrence rates of input events. However, the resulting indication of period measurement is less acceptable than the direct indication of frequency provided by the former operating mode, and a calculation is required whenever it is desired to convert the period indication to an indication of frequency.

SUMMARY OF THE INVENTION

Accordingly, the present invention counts both the input events and the reference events during a measurement interval which is determined by the input events and the approximate desired measurement period, and then arithmetically processes the separate counts to produce an indication of the frequency of recurrence of the input events. The present invention thus provides the resolution of conventional period counters as well as the direct display provided by conventional frequency counters.

DESCRIPTION OF THE PREFERRED EMBODIMENT

Figure 1:
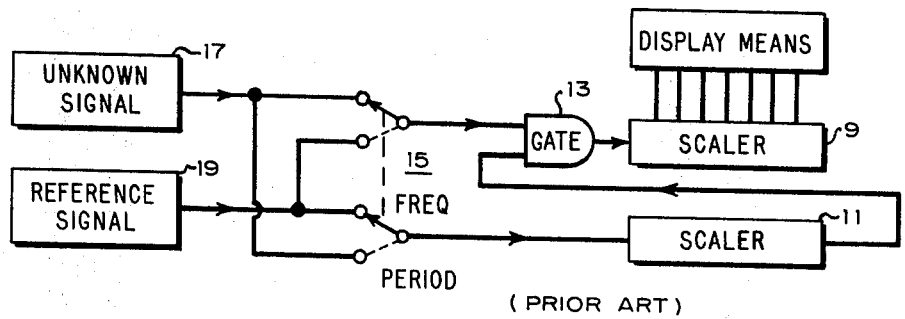
FIG. 1 is a schematic diagram of a conventional counter apparatus capable of measuring period or frequency of input pulses.

Referring now to the conventional counter apparatus of FIG. 1, there is shown a simplified arrangement of a pair of scalers 9, 11, a gate 13 and mode-selecting switching means 15. Counter apparatus of this type is widely reported in the literature and accordingly is discussed only briefly herein. The scaler 9 may also be referred to as one or more decade-counting units, each of which counts groups of 10 applied pulses and produces a carry signal for application to the next unit in line. Each decade-counting unit thus scales down the repetition rate of applied pulses by 10 so that, with display means associated with each unit, the units may count and display the total number of applied pulses according to units, tens, hundreds, thousands, etc. designations of the displayed digits. Pulses to be counted may be applied to the scaler 9 for a predetermined counting interval. The gate 13 controls application of pulses to scaler 9 in accordance with the operating mode selected by switching means 15. In the frequency measuring mode, the switching means 15 (in the position as shown) applies unknown signal from a source 17 to the scaler 9 through gate 13 for an interval of time which is determined by the reference signal from source 19 and scaler 11. The scaler 11 usually includes one or more decade dividers, each of which produces an output for application to a succeeding divider in response to ten pulses applied thereto. In this way, the gate 13 passes the unknown signal form source 17 to the scaler 9 for an interval that is decimally related to the frequency of the reference signal from source 19. If this measurement interval is related to one second in time, then the display means associated with scaler 9 may thus provide a direct display of frequency in Hertz of the unknown signal from source 17.

When the switching means is set in the period mode (alternate position as shown), then the scaler 9 counts reference signal from source 19 for an interval determined by the unknown signal from source 17. The time interval during which gate 13 is conductive is determined by the decade division by the scaler 11 of the frequency of the unknown signal from source 17. The display means associated with scaler 9 thus provides a direct display of the number of reference signals from source 19 which were counted during the unknown time interval and this display thus represents the average period between the unknown signals form source 17. However, in order to obtain the desired information about the frequency of unknown signal from source 17, a calculation must be performed on the direct display to obtain the reciprocal of the period indication.

Figure 2:
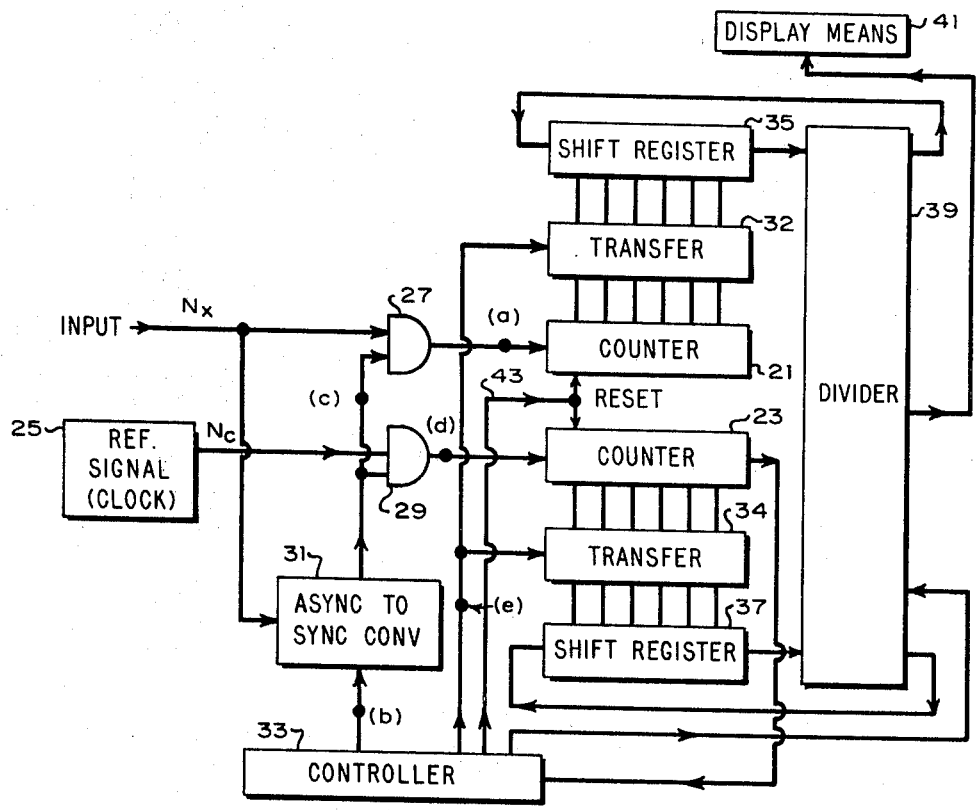
FIG. 2 is a schematic diagram of the circuit of the present invention.

Referring now to FIG. 2 which shows a circuit diagram of one embodiment of the present invention, there is shown a counter 21 arranged to count the unknown input signal $N_x$ and a counter 23 arranged to count the reference signal $N_c$ from a reference source or clock 25. In accordance with the present invention, both counters 21 and 23 are operated simultaneously for substantially identical counting intervals to accumulate total counts of unknown input signals (in counter 21) and of reference signals (in counter 23) from clock 25. The counting interval for the two counters is controlled by the gates 27, 29 connected in the respective input lines to the counters 21, 23 which gates 27, 29 receive a synchronized gate signal, as shown in waveform b of FIG. 3, from the asynchronous to synchronous converter circuit 31. This converter circuit 31 receives from the controller 33 an asynchronous arming signal (waveform b of FIG. 3) that has a length or duration which is representative of the approximate desired counting interval. This approximate counting interval is determined by the controller 33 as the interval of, say, M number of recurrences of the reference signal $N_c$, as scaled by counter 23. In general, the gate signals (waveform b of FIG. 3) are not synchronized with occurrences of the unknown input signals (waveform a of FIG. 3) and therefore may be unsuitable in practice for operating the counting gates 27, 29 where a high degree of measurement accuracy is required. The converter circuit 31 may include conventional clocked flip-flop circuits, or other suitable armable and triggerable circuits, for producing the actual gating signal, as shown in waveform c of FIG. 3 with leading and trailing edges synchronized with the occurrences of unknown input signals $N_x$. The gates 27, 29 are thus enabled for the period of the actual counting interval (waveform c of FIG. 3) which has a duration that is equal to an integer number of occurrences of the unknown signals $N_x$. Counter 21 thus counts an integer number of recurrences of the unknown signals $N_x$ during the actual counting interval (waveform c of FIG. 3) and counter 23 counts the number of recurrences of the reference signal from clock 25 during the same counting interval.

Figure 3:
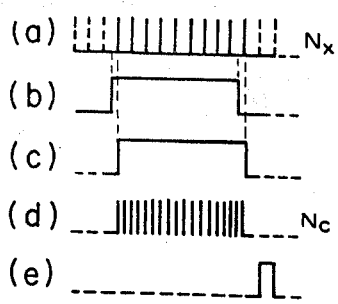
FIG. 3 is a graph showing operating waveforms of the circuit of FIG. 2.

At the end of the actual counting period waveform c of FIG. 3, controller 33 disables the gates 27 and 29, thereby preventing the counters 21, 23 from accumulating additional counts. The counts of signals in the counters 21, 23 are transferred through transfer gates 32, 34 to the shift registers 35, 37 respectively, in response to a transfer command (waveform e of FIG. 3) applied to the transfer gates 32, 34 by the controller 33. Each of the shift registers 35, 37 attains an operating state that corresponds to the count transferred thereto from the associated counters 21, 23. The operating states of the shift registers 35, 37 typically include several data bits or logic stages, each of which or groups of which may represent selected digits of the counts transferred thereto. It should be understood that the individual digit stages of the counters 21, 23 may also serve as the shift register stages directly. In this way, the logic elements per digit which operate to accumulate counts during the actual gating period of waveform c of FIG. 3, may then be interrogated in digit sequence upon command (say, waveform

*e* of FIG. 3) during the division operation to yield the desired dividend and divisor numbers.

During the division operation, the data bits or logic states of each register 35, 37 (or counter-register 21, 23) may be supplied to an arithmetic divider 39 which divides the number (dividend) represented by the logic states in register 35 by the number (divisor) represented by the logic states in register 37. The divider 39 may perform conventional computer division operations on the data bits or logic states of the registers, 35, 37 which are sequentially applied to the divider in a conventional manner (see, for example, U.S. Pat. application Ser. No. 559,887 filed on June 23, 1966 by Thomas E. Osborne, now issued as U.S. Pat. No. 3,566,160 entitled SIMPLIFIED RACE-PREVENTING FLIP-FLOP HAVING A SELECTABLE NOISE IMMUNITY THRESHOLD. The quotient of the two numbers represented by the logic states in registers 35, 37 is thus a direct indication of the frequency of the input signal $N_x$. The quotient may be supplied to a suitable display means 41 to provide a visual indication of the frequency of the input signal. This display means 41 may include conventional display storage circuitry, decoding circuitry, and the like, for maintaining a continuous display as the associated circuitry is disconnected therefrom to perform another measurement operation, as described above. Alternately, since the time required for division is typically less than one millisecond, one of the existing registers such as 35 or 37 or a register for accumulating the quotient may also be used for display storage during the time it is not being used for computation. If computations are frequent, display blanking may be employed to mask the computational use of the storage register.

After the counts on counters 21, 23 are transferred to the registers 35, 37, respectively, the counters may then be reset by a signal on line 43 from the controller 33 and the gates 27, 29 may be enabled again to permit the counters 21, 23 to accumulate new counts of the input and reference signals, respectively.

Operation of the illustrated embodiment of the present invention in the manner described above thus assures that the usual ±1 count ambiguity is referred to the reference signal which has a frequency that is high and near the limit of counting speed of counter 23. This provides the high measurement resolution usually obtained with period counters as well as the direct frequency readout usually obtained with frequency counters. Also, the arithmetic processing of two independent counts provides versatility in the selection of measurement time and the convenience of direct display of frequency over a wide range of unknown input signal frequencies. The present invention also accurately measures pulse modulated signals or signal bursts since the asynchronous to synchronous converter 31 can be armed by the controller 33 in the absence of an input signal. The measurement will then start on receipt of an input signal and, as long as the measurement time is less then the burst duration, an accurate measurement will be made.

We claim:

1. Digital signal apparatus comprising:
    first and second signal-counting means, each for accumulating a count of the number of signals applied thereto;
    a source of reference signal and an input terminal for receiving applied signals;
    first and second gating means, each being enabled to pass signal therethrough in response to control signal applied thereto;
    said first gating means being connected to apply reference signal from said source to the first signal-counting means and said second gating means being connected to apply signal appearing at said input terminal to the second signal-counting means;
    gate control means coupled to each of said gates for applying control signal thereto for selected time intervals of substantially equal duration;
    divider means responsive to the accumulated counts in each of the first and second signal-counting means for producing an output proportional to the quotient of the accumulated count in one of the first and second signal-counting means divided by the accumulated count in the other of the first and second signal-counting means; and
    display means responsive to said output for producing an output indication of said quotient of the one accumulated count divided by the other accumulated count.

2. Digital signal apparatus as in claim 1 wherein said gate control means includes means coupled to said input terminal for applying control signals simultaneously to said first and second gating means substantially in synchronism with signal appearing at said input terminal.

3. Digital signal apparatus as in claim 2 wherein:
    said gate control means includes a trigger circuit which produces said control signal in response to a triggering signal applied thereto following arming of the trigger circuit in response to an arming signal applied thereto;
    means coupled to said gate control means for applying thereto an arming signal derived from said reference signal; and
    means coupled to said gate control means for applying a triggering signal thereto derived from signal appearing at said input terminal for initiating and terminating said control signal in synchronism with signals at said input terminal that appear, respectively, after said arming signal is applied to said gate control means and after said arming signal is removed.